(12) United States Patent
Hadala

(10) Patent No.: US 6,925,872 B2
(45) Date of Patent: Aug. 9, 2005

(54) TEMPERATURE-SENSING DEVICE FOR DETERMINING THE LEVEL OF A FLUID

(76) Inventor: Anthony J. Hadala, 7914 N. Gannett, Sagamore Hills, OH (US) 44067

( * ) Notice: Subject to any disclaimer, the term of this patent is extended or adjusted under 35 U.S.C. 154(b) by 130 days.

(21) Appl. No.: 09/992,610

(22) Filed: Nov. 19, 2001

(65) Prior Publication Data

US 2003/0094042 A1 May 22, 2003

(51) Int. Cl.$^7$ .............................................. G01F 23/00
(52) U.S. Cl. .............................. 73/295; 73/291; 73/292; 165/168
(58) Field of Search ........................ 73/291, 292, 295; 165/168; 285/321

(56) References Cited

U.S. PATENT DOCUMENTS

| | | |
|---|---|---|
| 3,696,675 A | 10/1972 | Gilmour |
| D242,605 S | 12/1976 | Van Kersen |
| 4,232,552 A | 11/1980 | Hof et al. |
| 4,246,785 A | 1/1981 | Sellers et al. |
| 4,302,971 A | 12/1981 | Luk |
| 4,339,207 A | 7/1982 | Hof et al. |
| 4,358,955 A * | 11/1982 | Rait ............................. 73/295 |
| 4,362,645 A | 12/1982 | Hof et al. |
| 4,690,299 A * | 9/1987 | Cannon .................. 220/592.19 |
| 4,854,160 A | 8/1989 | Glatt |
| 5,099,688 A * | 3/1992 | de Mars ....................... 73/295 |
| 5,165,569 A | 11/1992 | Furuhashi et al. |
| 5,218,834 A | 6/1993 | Major et al. |
| 5,323,652 A | 6/1994 | Parker |
| 5,385,044 A | 1/1995 | Thomas et al. |
| 5,426,593 A | 6/1995 | Seiden et al. |
| 5,482,373 A * | 1/1996 | Hutchinson .................. 374/141 |
| 5,655,839 A | 8/1997 | Schmidt |
| 5,658,324 A * | 8/1997 | Bailey et al. ................ 607/104 |
| 5,686,153 A | 11/1997 | Henyderickx et al. |
| 5,707,590 A | 1/1998 | Thomas et al. |
| 5,738,442 A | 4/1998 | Paron et al. |
| 5,894,089 A * | 4/1999 | Ogawa ......................... 73/295 |
| 6,012,411 A | 1/2000 | Hochbrueckner |
| 6,119,464 A | 9/2000 | Nakayama et al. |
| 6,260,414 B1 | 7/2001 | Brown et al. |

FOREIGN PATENT DOCUMENTS

DE         3345593 A1 *  4/1985  ........... G01F/23/22

OTHER PUBLICATIONS http://explanation–guide.info/meaning/ambient–temperature.html.*
brochure entitled Raynger® ST™ that describes ST30 Pro™ Standard and ST30 Pro™ Enhanced non–contact thermometers.
A product label from a device apparently corresponding to that disclosed in the Gilmour patent.

* cited by examiner

Primary Examiner—Hezron Williams
Assistant Examiner—André K. Jackson
(74) Attorney, Agent, or Firm—Forrest L. Collins Law Offices, LLC; Forrest L. Collins

(57) ABSTRACT

The present invention deals with determining the level of fluid in a container. Typically, a beverage container containing a liquid will absorb heat energy from the surrounding environment at a greater rate than a gaseous component in the headspace of the beverage container. Thus, as the liquid is drawn from a beverage container a greater headspace results. If a thermometric measuring device is employed along the height of the beverage container the volume may be determined by observing the difference in the temperature along the height of the beverage container. In practice, a beer keg may exhibit a difference of as much as 9 degrees Fahrenheit on the exterior surface of the beer keg when measured at the headspace as opposed to the area where the liquid is present in the beverage container.

9 Claims, 3 Drawing Sheets

TEMPERATURE-SENSING DEVICE FOR DETERMINING THE LEVEL OF A FLUID

CROSS-REFERENCE TO RELATED APPLICATION

This application claims the benefit of copending U.S. patent application Ser. No. 09/792,663 filed Feb. 23, 2001. Application Ser. No. 09/792,663 filed Feb. 23, 2001 is specifically incorporated herein.

BACKGROUND OF THE INVENTION

1. Field of the Invention

The present invention relates to determining the level of fluid in a container and the like.

2. Description of the Art Practices

U.S. Pat. No. 5,655,839 issued to Schmidt, et al., Aug. 12, 1997 describes an IR temperature sensor that comprises a sealed housing containing an inert gas atmosphere and enclosing a detector for conversion of heat radiation into an electrical signal, an optical system which images the heat radiation emanating from an object onto the detector, a heat-conducting temperature equalization element which maintains the detector and the optical system at a common temperature, and a temperature sensor which measures the temperature of the temperature equalization element. The sealed housing protects the sensor from the external environment and maintains uniform temperature between the optical system and the sensor.

Further information concerning infrared temperature sensors is found in a brochure entitled Raynger® ST™ that describes ST30 PrO™ Standard and ST30 Pro™ Enhanced noncontact thermometers. The ST30 Pro™ Standard and ST30 Pro™ Enhanced noncontact thermometers are available from Raytek Corporation 1201 Shaffer Road Post Office Box 1820 Santa Cruz, Calif. 95061-1820.

U.S. Pat. No. 4,362,645 that issued to Hof, et al. Dec. 7, 1982 describes temperature-indicating compositions of matter. U.S. Pat. No. 4,362,645, in particular describes stable compositions of matter which change color sharply upon a transition from a liquid state to a solid state or from a solid state to a liquid state, which change of state is at substantially a predetermined temperature corresponding to a temperature to be measured.

The constituents of the Hof, et al. compositions of matter comprise: 1. a solvent (I) consisting of a single substance or a mixture of substances and adapted to change from a solid state at substantially a predetermined temperature to a liquid state and 2. an indicator system (II) consisting of one or more substances different from (I), characterized in that (a) (II) is soluble in (I) when the latter is in the liquid phase, and (b) (II) changes color visible to the naked eye when (I) passes from the solid to the liquid phase or from the liquid to the solid phase. Thermometers containing said stable compositions of matter are also disclosed.

U.S. Pat. No. 4,339,207 also to Hof, et al. which issued Jul. 13, 1982 describes a temperature indicating device is disclosed comprising: (a) a flat or gradually curved heat-conducting carrier having one or more cavities, each substantially filled with a composition of matter; or in the alternative, with (1) a composition of matter which changes from opaque to transparent upon a corresponding change from solid to liquid on top of an (2) indicator means located at the bottom of the cavity; said composition of matter, whether novel or not, being substantially without impurities and containing a substantially spherical void space between the bottom of the cavity; and (b) a transparent cover sheet means in sealing engagement with the heat conducting carrier means overlying and above the cavity, which spherical void space acts to magnify the color change if the novel compositions of matter are present or the presence of an indicator means upon melting of the compositions of matter in the cavity.

The compositions of matter of Hof et al., are further described as changing color sharply upon a transition from a liquid state to a solid state or from a solid state to a liquid state, which change of state is at substantially a predetermined temperature corresponding to a temperature to be measured.

U.S. Pat. No. 4,232,552 issued to Hof, et al. Nov. 11, 1980 discloses temperature-indicating compositions of matter. The Hof, et al. compositions Novel and stable compositions of matter are disclosed which change color sharply upon a transition from a liquid state to a solid state or from a solid state to a liquid state, which change of state is at substantially a predetermined temperature corresponding to a temperature to be measured. The constituents of the novel compositions of matter comprise: 1. a solvent (I) consisting of a single substance or a mixture of substances and adapted to change from a solid state at substantially a predetermined temperature to a liquid state and 2. an indicator system (II) consisting of one or more substances different from (I), characterized in that (a) (II) is soluble in (I) when the latter is in the liquid phase, and (b) (II) changes color visible to the naked eye when (I) passes from the solid to the liquid phase or from the liquid to the solid phase. Thermometers containing stable compositions of matter are also disclosed in U.S. Pat. No. 4,232,552.

Seiden, et al., in U.S. Pat. No. 5,426,593 issued Jun. 20, 1995 is directed to a device which measures the oxygen component of a beverage gas using a specific oxygen probe, ultrasonic degassing, a special valving technique, and microprocessor based software. The measurement is made in the gaseous state in a two-chamber system.

The device of Seiden, et al., is controlled by an electronic console that is built around a microprocessor which sequences and times the valves, receives the data from the oxygen probe and its accompanying temperature compensation circuit, and displays the data. An alternative method is to use several chambers and one pass. Additional chambers may be used to increase the speed of the test, control interferences, or aid in identifying gases other than the oxygen component. The device may also have an interface piercing head manifold that allows carbon dioxide and oxygen to be tested in the same container and in one preparation. The invention also relates to specific gas measurements with non-specific type measurements and the general techniques can be applied to environmental problems that involve oxygen demand and respiration of bacteria.

U.S. Pat. No. 6,119,464 issued to Nakayama, et al. on Sep. 19, 2000 describes beverage servers and controlling methods for beverage servers. More particularly, Nakayama, et al. discloses a beverage server comprising a tank containing water serving as a coolant and a coiled beverage duct through which beer or other beverage flows and cooling means fitted to a portion of the wall of the tank so as to rapidly cool and serve beer or other beverage discharged from the storage container. The inner wall of the tank near the portion where the cooling means is fitted is made of a material having a high thermal conductivity, whereas the inner wall of the tank near the beverage duct is made of a material having a low thermal conductivity. A sensor is provided near the beverage duct to obtain information for controlling the cooling means. This simple beverage server assures stable serving of beverage at a suitable temperature. Another sensor is provided near a portion of the tank wall where the cooling means and a controller to controls the action of the cooling means based on the information from the sensors are also provided. The cooling means works at full capacity when one or both of the sensors have detected the melting of the coolant. This eliminates the risk of trouble due to cooling capacity deficiency even after a long interruption of cooling.

Furuhashi, et al., in U.S. Pat. No. 5,165,569 issued Nov. 24, 1992 recites a keg body for retaining draft beer substantially has adiabatic structure, in which draft beer filled in the keg body is kept cool. A part of the keg body is provided with a face which is not heat-insulated and this face is utilized as a cooling face. In case of necessity, beer is cooled from the outside through the cooling face to keep cool draft beer inside the keg body.

The reader is also directed to Hammerhead Products Accu-Level propane tank gauge. Hammerhead Products is located at 1720-22 Street Santa Monica, Calif. 90404.

To the extent that the foregoing patents are relevant to the present invention they are herein incorporated by reference. Temperatures herein are given in degrees Fahrenheit and pressures are in gauge Kpa. Ratios and ranges may be combined.

SUMMARY OF THE INVENTION

The present invention describes a method for determining the level of fluid in a container comprising:

obtaining a container having an outlet for a first fluid and an inlet for a second fluid;

said container having a first fluid region therein;

a first fluid being present at an original level in said first fluid region of said container;

said container, for when in use, having said first fluid at least partially removed from said container thereby forming a second fluid region;

placing on at least one exterior surface of said container at least one temperature-measuring device;

at least one said temperature-measuring device being located in a region of said container where said second fluid region is formed by removal of said first fluid;

initially observing a first temperature in said first fluid region of said container when said first fluid is present in said first fluid region of said container;

subsequently observing a second temperature in said second fluid region of said container after a portion of said first fluid has been removed;

correlating the difference between said first temperature and said second temperature to the level of said first fluid in said container.

Yet another aspect of the invention is a temperature-measuring device mounted on a magnetic strip said temperature measuring device having a width, a height, and a thickness, provided further that the dimensionless ratio of said width to said height is about 0.5 to about 10 to about 1 to about 5.

Another aspect of the invention is a temperature-measuring device mounted on an adhesive strip said temperature measuring device having a width, a height, and a thickness, provided further that the dimensionless ratio of said width to said height is from about 0.5 to about 10 to about 1 to about 5.

A further embodiment of present invention is a fluid dispensing assembly comprising:

a sealed container, for when in use, containing a liquid under pressure;

said sealed container having an exterior surface;

said exterior surface of said sealed container having a heightwise dimension and a widthwise dimension;

at least one temperature-measuring device positioned heightwise dimension on said exterior surface, provided further that said temperature-measuring device measures temperatures in the range of about 34° F. to about 94° F.

Yet another aspect of the invention is a flexible band temperature-measuring device capable of determining a 2° F. temperature change in the range of about 34° F. to about 94° F.

Another aspect of the invention is device comprising a series of at least two substantially parallel strips having temperature-measuring capability.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DETAILED DESCRIPTION OF THE INVENTION

Figure 1:
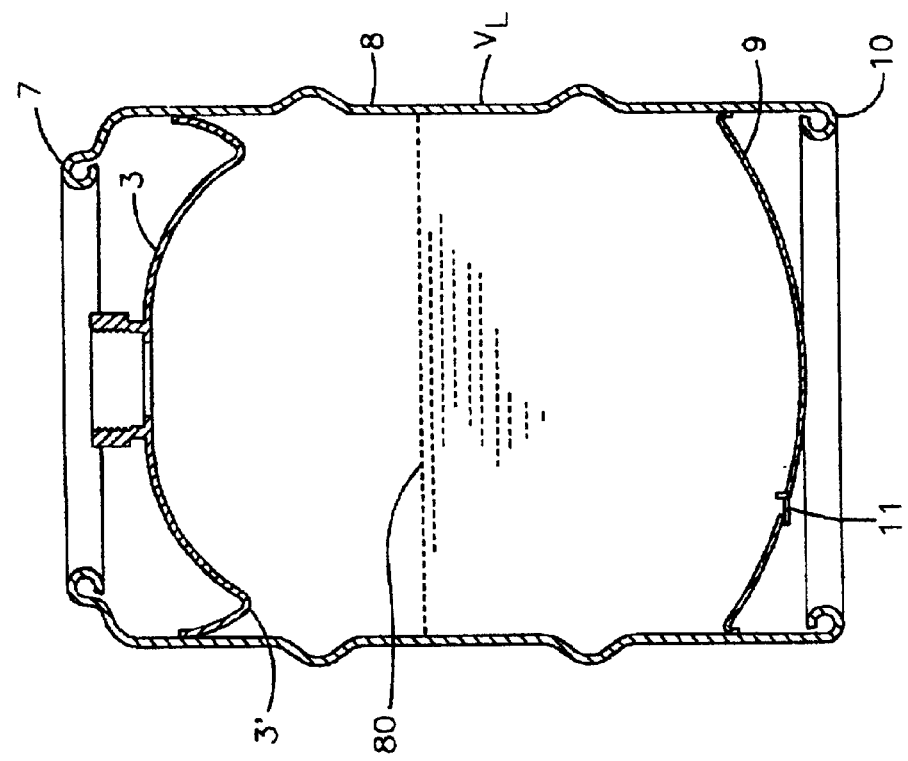
FIG. 1 is a partial cross-sectional perspective view showing a first embodiment of a beer keg of the invention.

In FIG. 1, a beer keg 1 according to a first embodiment of the invention is shown. The beer keg 1 is generally cylindrical.

Figure 2:
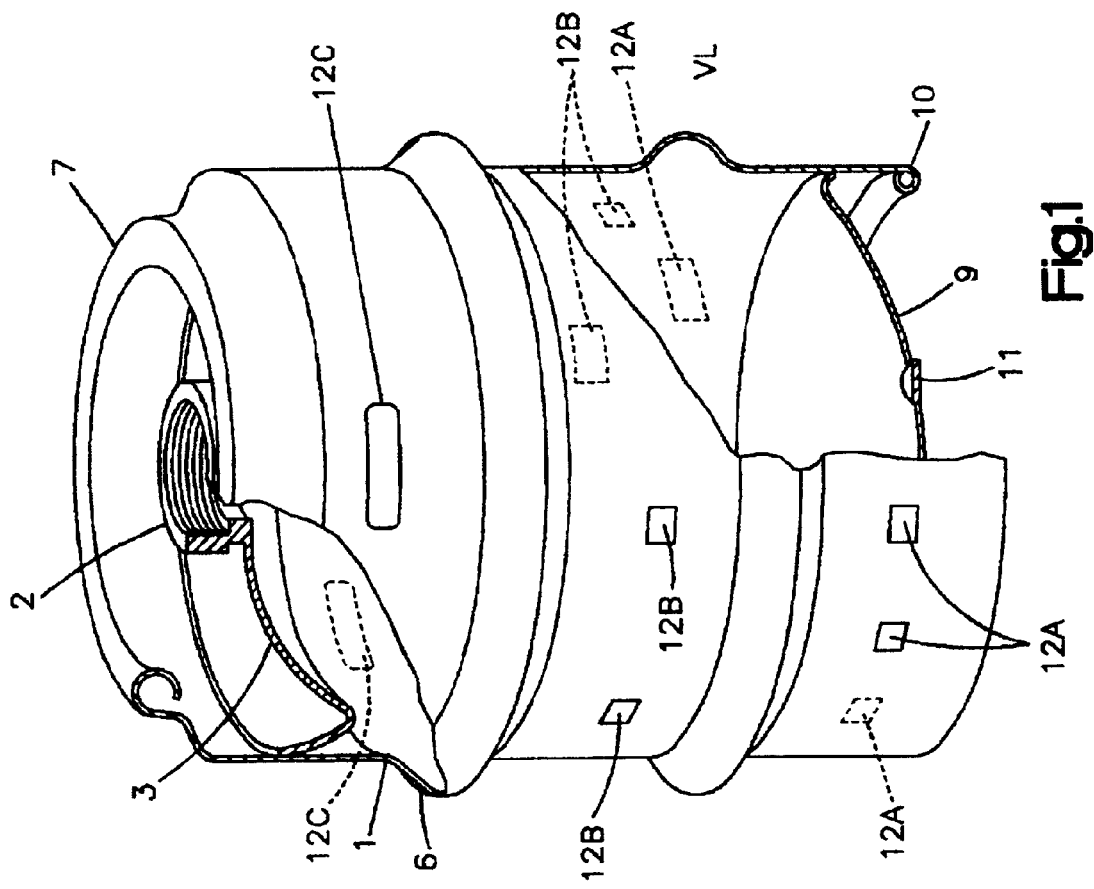
FIG. 2 is a longitudinally cross-sectional view showing a beer keg having draft beer in the beer keg.

As shown in FIG. 2, the beer keg 1 is a container made of thin stainless steel plate, and having a mouthpiece 2 and a bottom. The beer keg 1 is prepared by welding an inner cylinder upper plate 3, the outer cylinder shell 6, and an outer cylinder lower plate 9.

Figure 3:
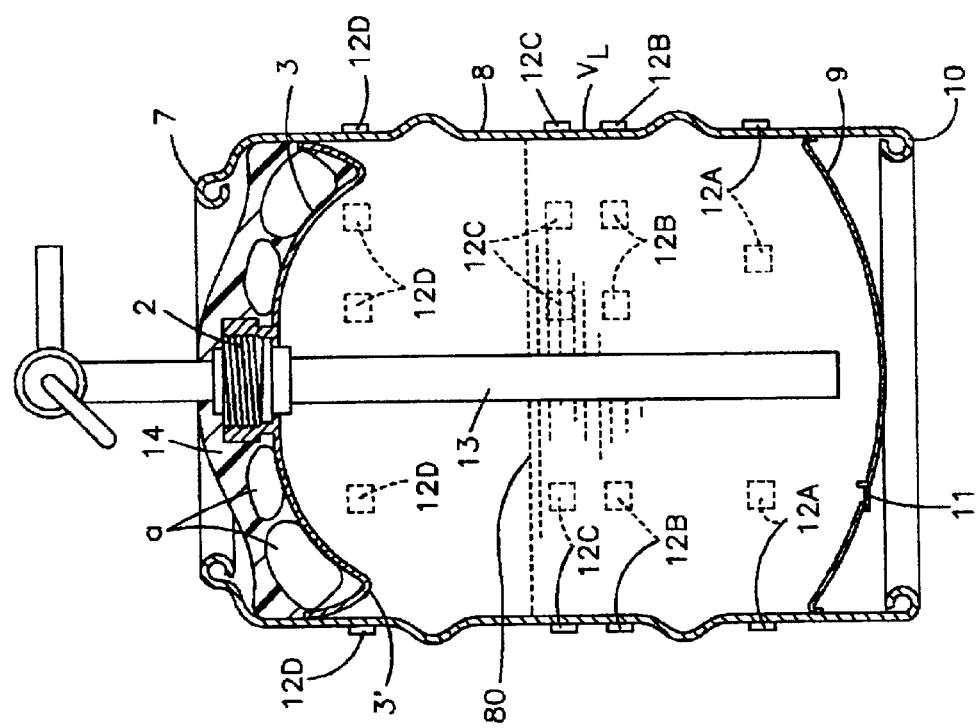
FIG. 3 is a view showing a beer keg.

The outer cylinder shell 6 is in a cylindrical form and is integrally sealed, at its upper and lower edges with the inner cylinder plate 3 and the outer cylinder plate 9, respectively, by TIG welding. In this embodiment, the mouth piece 2 is mounted on the center of thinner cylinder plate 3. A down tube 13 shown in FIG. 3 is inserted into the beer keg 1 through the mouth piece 2.

The down tube 13 is a tube for providing draft beer into the inside of the beer keg 1 and also ejecting draft beer from the beer keg 1. The down tube 13 has a carbon dioxide-valve (not shown) and a beer valve (not shown) and is screwed in the mouthpiece to be fixed.

The keg outer cylinder 6 is formed of an outer cylinder shell 8 and an outer cylinder lower plate 9. The outer cylinder shell 8 has an upper grip 7 at its upper opening edge and a keg leg 10 at its lower opening edge, respectively. Both upper and lower edges are bent inwardly. The diameter of the upper edge is slightly smaller than that of the lower edge, but the upper and lower portions of the outer cylinder shell 8 may be reversible upside down.

At the proper standing posture of the outer-cylinder shell 8, the upper edge acts as the upper grip 7 and the lower edge operates as the keg leg 10. At the inverted posture thereof, the upper edge acts as the keg leg 10 and the lower edge acts as the upper grip 7.

As shown in FIG. 1, a plurality of thermometric measuring devices 12 are provided on the outer cylinder shell 8. The thermometric measuring devices 12 are designated as 12 A, 12 B, 12 C, and 12 D. The thermometric measuring devices 12 are so designated by the appended letter to show the location on the keg outer cylinder 6.

Several eutectic materials are disclosed in U.S. Pat. No. 4,362,645 that issued to Hof, et al. Dec. 7, 1982 as well as the remaining cited Hof, et al. patents. Similar eutectic materials may be formulated from foregoing disclosures to provide a suitable temperature range for determining the temperature within a container such as a beer barrel.

The thermometric measuring devices 12 are first located along the height of the keg outer cylinder 6 and generally correspond to a level of 10 percent of maximum fluid content of the beer keg 1, 25 percent of maximum fluid content of the beer keg 1, and 75 percent of maximum fluid content of the beer keg 1. Alternatively, thermometric measuring devices 12 are conveniently located at a point from 5% to 35% of the maximum original fluid level in said first fluid region of said container.

The thermometric measuring devices 12 are also located circumferentially around the keg outer cylinder 6. Conveniently, the thermometric measuring devices 12 located around the circumference of the keg outer cylinder 6 are two, three, four, five, six, seven, or eight in number.

The thermometric measuring devices 12 located around the circumference of the keg outer cylinder 6 are to aid in the determination of fluid level. As the beer kegs are quite heavy and when tapped with associated piping the movement of beer kegs is difficult. Also the movement of the beer kegs into a cooler of confined dimensions makes it difficult to move the kegs within a cooler. Accordingly, a plurality of thermometric measuring devices 12 makes it easier to see at least one of the thermometric measuring devices 12.

When for example, there are two of the thermometric measuring devices 12 circumferentially located on the keg outer cylinder 6 either of the two the thermometric measuring devices 12 may be read. If there are three of the thermometric measuring devices 12 circumferentially located on the keg outer cylinder 6 and each is located approximately 120 degrees apart it will be easier to see at least one of the thermometric measuring devices 12.

The thermometric measuring devices 12 are conveniently placed in as close a contact as is possible with keg outer cylinder 6. The thermometric measuring devices 12 may be adhesive backed to permit relatively intimate contact with the keg outer cylinder 6. Alternatively, the thermometric measuring devices 12 may be affixed to the keg outer cylinder 6 by means of a transparent pressure sensitive adhesive tape (not shown). The transparent pressure sensitive adhesive tape permits viewing of the thermometric measuring devices 12 to determine the temperature and accordingly the volume level of the beer keg 1.

The outer cylinder lower plate 9 is provided with a nozzle 11 having a valve. After the valve is opened and the nozzle 11 is connected to a vacuum pump (not shown) air or liquid in the beer keg 1 is removed. In this manner the beer keg 1 may be cleaned. Then, the valve is then closed to permit filling of the beer keg 1.

In a brewery, there is a line where a beer keg 1 incorporated with the down tube 13 is automatically washed and draft beer is automatically filled in the beer keg 1. Similarly, the beer keg 1 of the present invention is automatically washed and filled with draft beer by using the above-mentioned line. The beer keg 1 filled with the draft beer is stored in a refrigerator for shipping to forcibly cool beer in the beer keg 1 through the face Cz. In shipping, as shown in FIG. 3, the upper face of the inner cylinder upper plate 3 of the beer keg 1 is covered with an adiabatic mat 14 to keep low temperature. The beer keg 1 is kept in a proper standing posture, so that temperature of draft beer filled in the beer keg 1 does not substantially rise due to the fact that draft beer is heat-insulated by the vacuum layer between the beer keg 1 and the outer cylinder shell 8. After the beer keg 1 of the present invention is supplied to and stored in a tavern, beer is kept cool in a refrigerator in an inverted posture or horizontal posture. Draft beer is cooled through the face Cz of the inner cylinder upper plate 3, so that the draft beer can be effectively forcibly cooled.

In the beer keg 1 described in the present invention, the upper end hole of the outer-cylinder shell 8 is reduced in diameter to be smaller than the lower end hole, but either one of the upper and lower edges of the outer cylinder shell 8 becomes a grip or keg leg, so that the beer keg 1 can be placed without distinguishing upper and lower portions. On sale of draft beer at a tavern, beer is supplied in a conventional manner to a pitcher and so on through the down tube 13 while carbon dioxide is injected with pressure, wherein the beer keg 1 is vertically positioned to locate the mouth piece upwardly. To keep the draft beer cool during the sale is made by inserting a cooling agent a between the adiabatic mat 14 and the inner cylinder upper plate 3.

Figure 4:
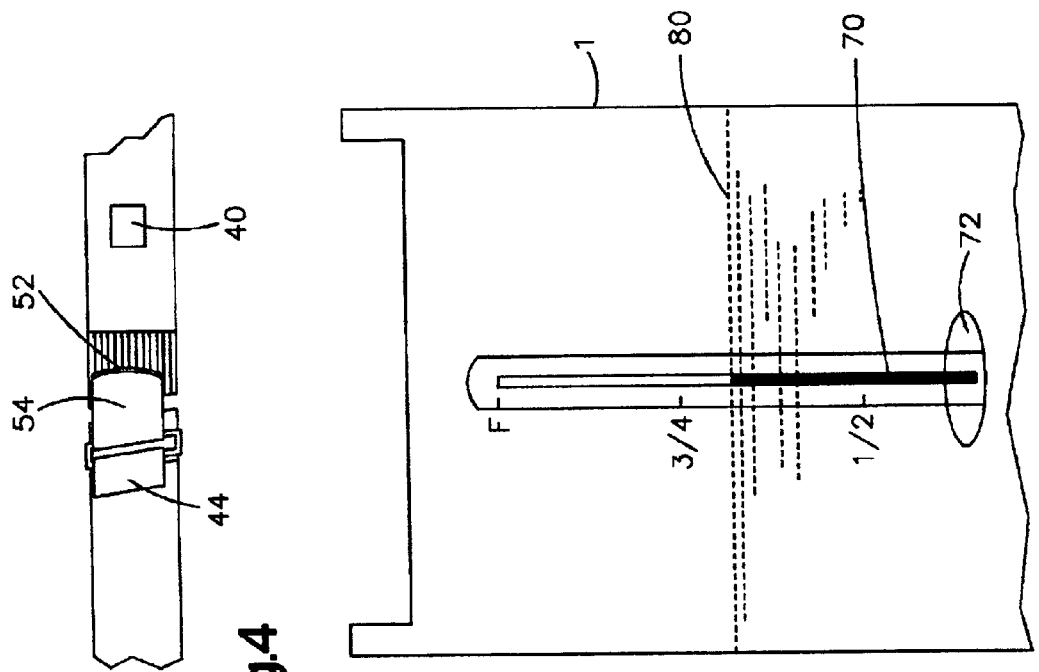
FIG. 4 is a thermometric fastening device according to the invention.

As best seen in FIG. 4, is a temperature-measuring device 40 mounted on a flexible band 44. The temperature-measuring device 40 is conveniently secured to a flexible band 44 such that the thermally sensitive portion of the temperature-measuring device 40 may be exposed to the outer side of a beer barrel. The temperature-measuring device 40 is conveniently insulated so that the ambient temperature such as in a region of low humidity as a refrigerator or refrigerator compartment will not interfere with the temperature-measurement and thus determination of level of fluid in the beer barrel.

The flexible band 44 may be an endless band such as formed form an elastomeric material. In a preferred embodiment, the flexible band 44 is a non-endless belt that is secured with a hook 52 and eye 54 fastener (Velcro). The temperature-measuring devices described herein are capable of determining a 2° F. temperature change in the range of about 34° F. to about 94° F., preferably in the range of about 34° F. to about 80° F.

Figure 5:
FIG. 5 is a view of another embodiment of the invention.

As best seen in FIG. 5 is a conventional mercury thermometer 70. The mercury thermometer 70 to a beer barrel. A small amount of an insulating material 72 is placed on the ball of the thermometer to ensure that is the temperature of the beer barrel and not the ambient temperature in the refrigerator that is observed.

In use, as best seen in FIG. 2, is the level of beer 80 in a beer keg 1. It is observed that the beer 80 within the beer keg 1 has excellent heat flow characteristics when compared to the gas in the headspace out of the liquid level of the beer.

As the beer 80 is withdrawn from the beer keg 1 through the down tube 13, increased headspace occurs. The gas in the headspace will typically be warmer than the liquid in the beer keg 1. As such a temperature-measurement in the region of that headspace will result in a higher temperature than that in the liquid.

As best seen in FIG. 3, as the beer 80 is drawn from the level of 12 D to 12 C the heat flow characteristics will cause the thermometric measuring device 12 D to increase in temperature and to change color. The thermometric measuring device 12 C will maintain its temperature and not change color until the liquid level drops to the region below thermometric measuring device 12 C.

As the tavern owner will desire to know only the level of various kegs of beer it is possible to make such determination by observing where the colder temperature region of the beer keg is located. Thus, when the temperature of the beer keg 1 indicates that the colder temperature is only at the lower 10 percent of the beer keg 1 it is easily determined that the beer keg 1 should be changed prior to a busy evening. Of course, the temperature indicator on the beer keg 1 is also more than adequate to determine which are kegs are of sufficiently low temperature from which to serve the beer. The present invention also provides an opportunity for loss prevention or inventory control by tavern keeper.

In a situation where the mercury thermometer is utilized, the thermometer may be moved around on the beer keg 1. The present invention may also utilize the eutectic strips to determine during the course of the evening as to how far the beer has been depleted. The eutectic strips utilized herein may be of the liquid crystal variety. The tanks and cans with which the present invention is primarily concerned contain both a gas and a liquid phase. Therefore, beer, and carbonated soft drinks provide an excellent venue for the volume determination. Other products which may be employed include any common aerosol product such as pressurized whipped cream or a product such as a pressurized insecticide. However, it is possible to obtain readings on products in which a gas phase is formed as the product is utilized. Thus various aspects of the present invention may be utilized to determine the level in a container having therein oxygen, Freon (chlorofluorocarbons), acetylene, butane, propane, nitrogen, and the like.

Figure 6:
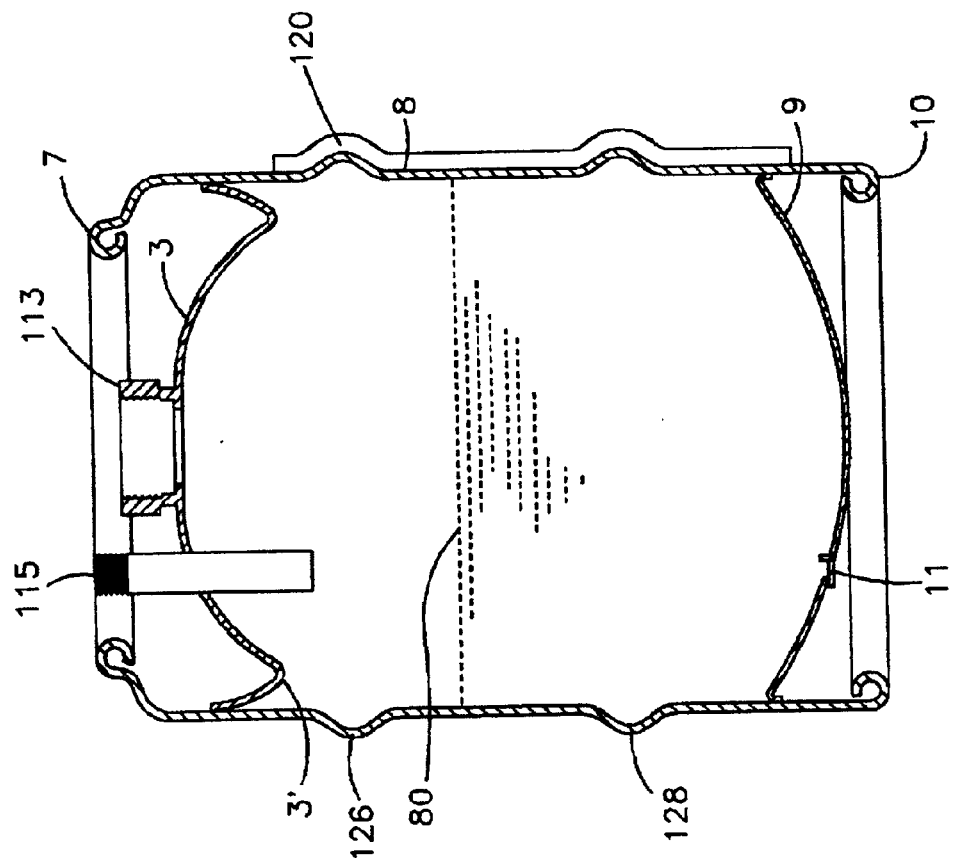
FIG. 6 is a longitudinally cross-sectional view showing a beer keg having draft beer in the beer keg; and, FIG. 7 is a schematic OF a thermometric measuring device.

As best seen in FIG. 6, is a second version of a beer keg 1 as shown in FIG. 1. In FIG. 6 there is an outlet tube 113 and a down tube 115. The outlet tube 113 is employed first to fill a liquid such as beer into the beer keg 1. Typically, a liquid such as beer will have carbon dioxide dissolved therein. The outlet tube 113 is then sealed to an airtight state. A single thermometric measuring device 120 in the form of an elongated thin strip is mounted on the side of the beer keg 1. The single thermometric measuring device 120 extends beyond the two ribs 126 and 128 on the outer cylinder shell 8 of the beer keg 1.

To prevent the beer from oxidizing, the down tube 115 has any remaining air (oxygen) drawn off by a vacuum from the beer keg 1. Thereafter, carbon dioxide may be added through the down tube 115 so that no other gas comes in contact with the surface of the beer. The down tube 115 is then sealed to an airtight state. In this manner the beer in the beer keg 1 is kept fresh and also has the correct degree of carbonation.

The beer keg 1 when tapped at a public house will have both the outlet tube 113 and the down tube 115 opened. The outlet tube 113 will then be connected to the appropriate tapped beer supply line (not shown). The down tube 115 will then be connected to a regulated carbon dioxide gas supply line (not shown). As of the beer is drawn off to the outlet tube 113 carbon dioxide is introduced through the down tube 115 to maintain the atmosphere within the beer barrel relatively free of oxygen and to provide pressure to force the beer through the outlet tube 113.

As the level of the beer in the beer keg 1 is reduced from a first beer level to beer level 80 the thermometric measuring device 120 rapidly detects the changing level of the beer because that portion of the temperature sensor on the beer barrel in the region of the gas above the beer level will be of a different color than the color where the liquid is present. The foregoing is believed to occur because the gas above the liquid surface is less able to draw in heat from the ambient region than is the liquid below the liquid surface. To aid in the temperature determination one may wipe a damp cloth along the temperature sensor to aid in the heat transfer effect. The damp cloth is at room temperature and may be conveniently utilized in a temperature range of 45° F. to 105° F. The method for determining the level of said first fluid in said container according to claim 1 additionally comprising the step of wiping the temperature-measuring device with a water moistened cloth wherein the temperature of the water-moistened cloth is less 90° F.

A variation on the present invention is to utilize a pony keg or a quarter barrel of beer (effectively differing only in size from the keg 1). In this situation, the pony keg is placed in a tub of ice to maintain the beer in a cold state. In this case the down tube 115 typically utilizes air pressure that is manually pumped into the pony keg. As the pony keg will typically be emptied the relatively short period of time the presence of atmospheric oxygen does not deteriorate the flavor of the beer. The temperature strip will accurately determine changes in the volume of the pony keg.

The thermometric measuring device 120 in the form of the strip is usually adhesive backed or magnetically backed. The adhesive backing or the magnetically backing permit easy attachment to the beer keg 1.

The products that are placed in sealed containers such as the beer keg 1, according to the present invention, are preferably intended for use at less than 100 pounds per square inch at 70 degrees Fahrenheit. Preferably the products in the sealed containers according to the present invention are pressurized between 5 and 90 pounds per square inch, or preferably between 10 and 80 pounds per square inch at 70 degrees Fahrenheit.

The thermometric measuring device 120 intended for a beer keg or relatively similarly sized pressurized container are up to 14 inches in length with a width of three-quarters of an inch. Conveniently, the temperature strips for cans are about 6 inches long with a width of three-quarters of an inch. The dimensionless ratio of the width to the height is about 0.5 to about 10 to about 1 to about 5, and preferably the dimensionless ratio of the width to the height is about 0.7 to about 10 to about 1 to about 4.

The thermometric measuring device 120 is sufficiently sensitive to temperature changes, which are indicative of volume, such that an ordinary can such as whipped 16' cream can (not shown) may have the remaining product determined by removing the whipped cream can from the refrigerator and placing it on a table for a few minutes. The color indicator of the thermometric measuring device 120 will then change with a relatively sharp line forming between the gas and liquid phases in the whipped cream can. Any can for which the temperature of the volume is desired should be maintained in an upright position and unnecessary shaking of the can avoided. Alternatively, a food product containerized in an aerosol can may be placed in the freezer compartment of a refrigerator for a few minutes and then removed. The temperature change of the single thermometric measuring device 120 in the form of an elongated thin strip is observed and the volume determined. A further method of determining the remaining product volume is to utilize the heat of the hand to slightly warm the can and then observe the color change in the single thermometric measuring device 120 in the form of an elongated thin strip.

Figure 7:
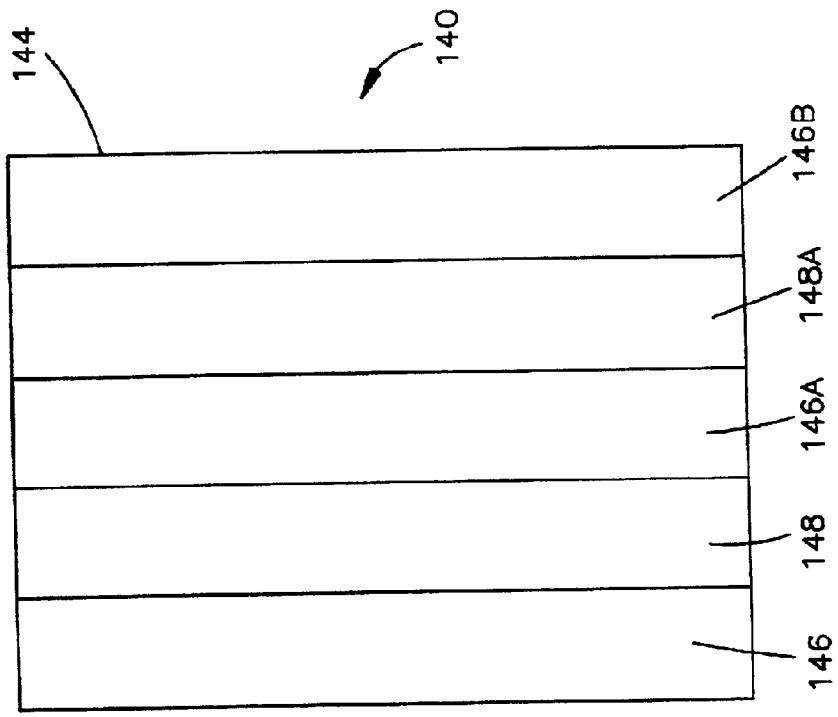

Alternatively, as best seen in FIG. 7 is a thermometric measuring device 140. The thermometric measuring device 140 is mounted on a magnetic strip 144. As previously discussed the thermometric measuring device 140 operates by sensing a color change that indicates the volume of a container. The thermometric measuring device 140 is formed form a plurality of separate sensors 146 the first of which is labeled 148. The first sensor 148 operates at a separate temperature range. Thus, for example, the first sensor strip 148 operates to indicate a temperature change, and hence volume, at from 36° F. to 46° F., whereas the second sensor strip 148 operates from 46° F. to 56° F., and so forth. The plurality of separate sensors 146 permits the operation of the thermometric measuring device 140 to function at differing ambient temperatures without the need for artificial aids such as pouring hot water on a propane tank. Additional sensors are shown as A & B and function over differing temperature ranges.

As one further embodiment, is possible to utilize an infrared thermometric device to make the determination of level of liquid in the beer keg 1. However, it is preferred that the thermometric temperature-measuring device be permanently affixed to the container so that it is readily available for the determination of volume and temperature.

What is claimed is:

1. A method for determining the level of a carbonated fluid in a container comprising:
   obtaining a container having an outlet for a first carbonated fluid and an inlet for introducing carbon dioxide;
   said container having a first carbonated fluid region therein; a first carbonated fluid being present at an original level in said first carbonated fluid region of said container;
   said container, for when in use, having said first carbonated fluid at least partially removed from said container while introducing carbon dioxide to said container thereby forming a second carbonated fluid region;
   mounting on at least one exterior surface of said container at least one temperature-measuring device in the form of an elongated thin strip;
   at least one said temperature-measuring device being located in a region of said container where said second carbonated fluid region is formed by removal of said first carbonated fluid;
   initially observing a first temperature in said first carbonated fluid region of said container when said first carbonated fluid is present in said first carbonated fluid region of said container;
   subsequently observing a second temperature in said second carbonated fluid region of said container after a portion of said first carbonated fluid has been removed; and,
   correlating the difference between said first temperature and said second temperature to the level of said first carbonated fluid in said container.

2. The method for determining the level of said first fluid in said container according to claim 1 wherein said first carbonated fluid is a liquid and is at least partially withdrawn through said outlet between the time of observing said first temperature and said second temperature.

3. The method for determining the level of said first carbonated fluid in said container according to claim 1 wherein said temperature-measuring device is adhered to an outer surface of said container as a magnetic strip.

4. The method for determining the level of said first carbonated fluid in a container according to claim 1 wherein at least one temperature-measuring device is a eutectic temperature-measuring device.

5. The method for determining the level of said first carbonated fluid in said container according to claim 1 wherein said container is in a refrigerator.

6. The method for determining the level of said first carbonated fluid in said container according to claim 1 additionally comprising the step of wiping the temperature-measuring device with a water moistened cloth wherein the temperature of the water moistened cloth is less than 105° F.

7. The method for determining the level of said first carbonated fluid in said container according to claim 1 wherein the pressure within said container at 70° F. is about 5 pounds per square inch to about 100 pounds per square inch.

8. The method for determining the level of said first carbonated fluid in said container according to claim 1 wherein said temperature-measuring device measures temperatures in the range of about 34° F. to about 94°F.

9. The method for determining the level of said first carbonated fluid in said container according to claim 1 wherein said temperature-measuring device measures temperatures in the range of about 34° F. to about 86°F.

* * * * *